United States Patent
March et al.

(10) Patent No.: US 12,231,443 B2
(45) Date of Patent: Feb. 18, 2025

(54) ANALYSIS OF ENDPOINT DETECT AND RESPONSE DATA

(71) Applicant: Musarubra US LLC, Plano, TX (US)

(72) Inventors: Agustin Matias March, Cordoba (AR); Raul Osvaldo Robledo, Cordoba (AR); Alejandro Houspanossian, Cordoba (AR); Gabriel Infante Lopez, Cordoba (AR)

(73) Assignee: Musaruba US LLC, Plano, TX (US)

( * ) Notice: Subject to any disclaimer, the term of this patent is extended or adjusted under 35 U.S.C. 154(b) by 0 days.

(21) Appl. No.: 18/121,543

(22) Filed: Mar. 14, 2023

(65) Prior Publication Data

US 2023/0216868 A1   Jul. 6, 2023

Related U.S. Application Data

(63) Continuation of application No. 16/586,804, filed on Sep. 27, 2019, now Pat. No. 11,621,965.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
CPC . H04L 63/1416; H04L 63/1425; H04L 63/20; G06N 20/00
See application file for complete search history.

(56) References Cited

U.S. PATENT DOCUMENTS

| | | | |
|---|---|---|---|
| 10,686,820 B1 | 6/2020 | Sheffer et al. | |
| 10,878,335 B1* | 12/2020 | Waugh | G06F 40/30 |
| 11,621,956 B2 | 4/2023 | Franzi | |
| 2010/0125594 A1 | 5/2010 | Li et al. | |
| 2014/0379619 A1* | 12/2014 | Permeh | G06N 5/02 |
| | | | 706/12 |
| 2016/0080399 A1 | 3/2016 | Harris et al. | |
| 2017/0078286 A1 | 3/2017 | Hunt et al. | |
| 2017/0169360 A1 | 6/2017 | Veeramachaneni et al. | |

(Continued)

FOREIGN PATENT DOCUMENTS

KR  101814368 B1  1/2018

OTHER PUBLICATIONS

Krebs, Rouven et al., "Architectural Concerns in Multi-Tenant SaaS Applications," Proceedings of the 2nd International Conference on Cloud Computing and Services Science (Closer-2012) pp. 426-431.

(Continued)

*Primary Examiner* — Joseph P Hirl
*Assistant Examiner* — Thomas A Gyorfi
(74) *Attorney, Agent, or Firm* — Hanley, Flight & Zimmerman, LLC

(57) ABSTRACT

There is disclosed a system and method of detecting security threats for an enterprise, including: filtering a first set of endpoint metadata records to identify a subset of metadata records, wherein filtering includes identifying endpoint security metadata records that are uncommon in context of the enterprise; and designating the subset of metadata records as indicating a potential security threat including designating the subset of metadata records for human analysis.

20 Claims, 10 Drawing Sheets

(56) References Cited

U.S. PATENT DOCUMENTS

| | | | |
|---|---|---|---|
| 2017/0302665 A1 | 10/2017 | Zou et al. | |
| 2018/0316691 A1* | 11/2018 | Strong | G06N 5/046 |
| 2019/0260785 A1* | 8/2019 | Jenkinson | H04L 63/1425 |
| 2020/0287924 A1* | 9/2020 | Zhang | G06F 16/288 |
| 2020/0314117 A1* | 10/2020 | Nguyen | H04L 63/145 |

OTHER PUBLICATIONS

International Searching Authority, "International Search Report," issued in connection with International Patent Application No. PCT/US2020/052381, mailed on Dec. 30, 2020, 4 pages.

International Searching Authority, "Written Opinion of the International Searching Authority," issued in connection with International Patent Application No. PCT/US2020/052381, mailed on Dec. 30, 2020, 7 pages.

United States Patent and Trademark Office, "Non-Final Office Action," issued in connection with U.S. Appl. No. 16/586,804, dated Jan. 21, 2022, 11 pages.

International Bureau, "International Preliminary Report on Patentability," issued in connection with International Patent Application No. PCT/US2020/052381, issued on Apr. 7, 2022, 9 pages.

United States Patent and Trademark Office, "Final Office Action," issued in connection with U.S. Appl. No. 16/586,804, dated Aug. 19, 2022, 14 pages.

United States Patent and Trademark Office, "Notice of Allowance and Fee(s) Due," issued in connection with U.S. Appl. No. 16/586,804, dated Nov. 23, 2022, 8 pages.

European Patent Office, "Extended European Search Report," issued in connection with European Patent Application No. 20869497.6, dated Aug. 24, 2023, 7 pages.

\* cited by examiner

ANALYSIS OF ENDPOINT DETECT AND RESPONSE DATA

CROSS-REFERENCE TO RELATED APPLICATIONS

This Application is a continuation (and claims the benefit of priority under 35 U.S.C. § 120) of U.S. application Ser. No. 16/586,804, filed Sep. 27, 2019 and entitled "ANALYSIS OF ENDPOINT DETECT AND RESPONSE DATA." The disclosure of the prior Application is considered part of and is incorporated by reference in the disclosure of this Application.

FIELD OF THE SPECIFICATION

This application relates in general to enterprise computer security, and more particularly, though not exclusively, to providing analysis of endpoint detect and response data.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
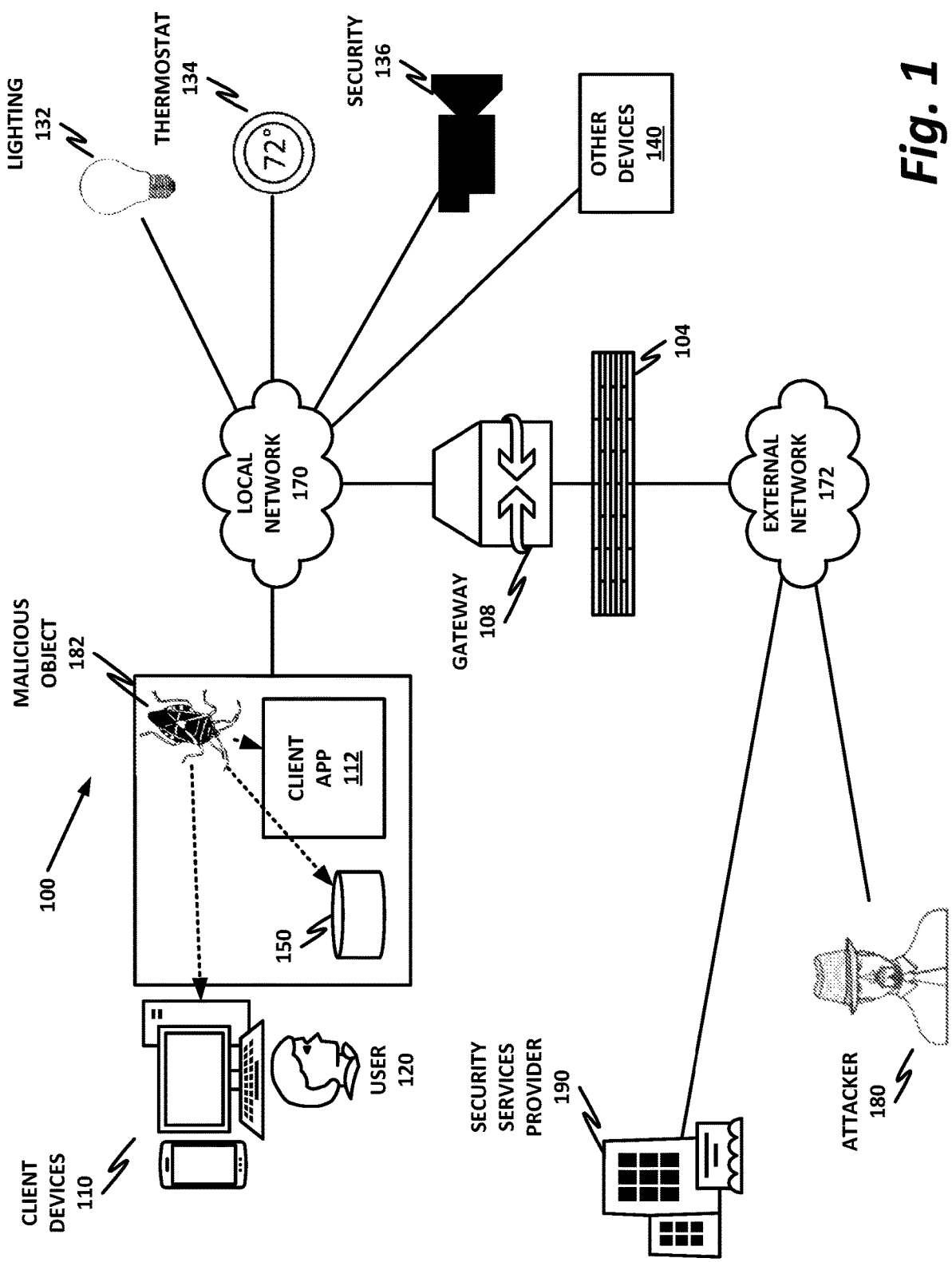
FIG. 1 is a block diagram of selected elements of a security ecosystem.

In an example, there is disclosed a computing apparatus to provide endpoint detect and response (EDR) filtering to an enterprise, comprising: a processor and memory; a network interface; a network protocol to communicatively couple to a data source via the network interface; and instructions encoded within the memory to provide an EDR filtering pipeline to receive an unfiltered EDR stream via the network interface, extract an EDR record from the EDR stream, and apply a hash to the EDR record to determine that the EDR record is uncommon in context of the enterprise; and a decorator module to decorate the EDR record for in-depth analysis.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

An advanced persistent threat (APT) is a malicious object that invades an enterprise and attempts to remain concealed or hidden so that it can persist. APTs are an issue across all computing use cases, and in some cases are particularly worrisome to large enterprises with large customer bases.

For example, an APT may target a large retailer with a large consumer base. The retailer's enterprise network may include a substantial volume of information that may be of interest to an attacker, such as personally identifying information (PII) for a large body of users, financial data, purchase histories, credit card numbers, username and password combinations, and other similar information. A successful APT attack on such a large enterprise may have significant consequences, because it affects not just a single user or a small group of users, but large cross-sections of the public.

A feature of an APT, if it is to be successful, may include anonymity to help maintain its persistence. If the APT object is similar to other malware objects, it may be easy to detect via traditional antivirus or anti-malware mechanisms. For example, if the APT uses a popular antivirus toolkit and includes only minimal customization, then it will be easily detectable to modern enterprise security software. Such security software may include the ability to perform fuzzy hashing or fuzzy matching, behavioral or heuristic analysis, deep static analysis, and sandboxed or dynamic analysis tools. If the object is easily identifiable as belonging to a particular family of malware, then it will quickly be mitigated and removed from the enterprise network.

To defeat such sophisticated security architectures, the APT author may deliberately design the APT object to be different from other security objects encountered on the enterprise network. Furthermore, if the author of the object is interested in breaching a particular enterprise, the object may be heavily customized and narrowly targeted to the features of the enterprise network.

Another feature of APT attacks is that they may include fileless or "living off the land" style exploits. In these types of exploits, the payload is not delivered as a traditional, monolithic executable file. Rather, the payload is disaggregated and installed throughout the file system, and may use features like return-oriented programming (ROP) to exploit cache lookahead vulnerabilities, registry entries, task schedulers, Windows Management Instrumentation (WMI) objects, and advanced scripting to carry out the attack.

In such a fileless attack, significant portions of the malware may be carried out by executing complex command line routines such as in the Windows PowerShell. The exploit may use a combination of flags, options, and targets to carry out its useful work. Because this exploit does not result in a monolithic executable with an easily identifiable hash, it may be harder to detect than traditional malware that installs executable files on the machine.

To mitigate security threats, an enterprise may have an internal security operation center (SOC), or may contract with a third-party security services provider to provide an SOC. Within the SOC, human security experts may examine endpoint detect and response (EDR) data provided by endpoints to the SOC. The EDR data may include events encountered by various endpoints, metadata associated with the events, and logs of actions taken in response to those events.

In the case of an APT, the attacker may have the express aim of hiding malicious activity by using legitimate tools instead of traditional binary malware blobs. This makes it difficult for security software such as antivirus software running on the endpoints to identify malware using common techniques such as signature matching.

EDR collection has been implemented in many enterprises as a countermeasure to APTs. In an illustrative example, an ADR solution collects data from client endpoints and sends the data to the cloud (e.g., to a third-party security services provider, or to an enterprise SOC) for analysis. The EDR traces sent to the cloud may include information such as user input, command lines, process create events (e.g., binary names and parameters), and similar.

In a nontrivial SOC, a large number of EDR traces will be received daily. For example, in a large enterprise or in a dedicated security services provider such as MCAFEE, LLC, the number of EDRs received daily may number in the thousands or millions. Thus, the size of the data set can quickly grow well beyond the ability of traditional human analysis. This is particularly true when the human analysis is intended to be performed in real-time or near real-time. To mitigate APTs, security researchers may need to analyze EDR data quickly and determine if the EDR traces represent a security threat. This can be difficult to do when the number of EDR traces received daily numbers in the thousands or millions. While it is possible to "brute force" the problem by applying a theoretically infinite number of security experts to the solution, this proposition can quickly become very expensive.

It is therefore advantageous to apply artificial intelligence (AI) and/or machine learning (ML) models to the EDR problem.

The problem of spotting an attacker's malicious behavior can therefore become a problem of carefully selecting what to trace at the endpoints, and modeling data to process the information in a way that supports real-time or near real-time analysis. The AI/ML solution can transcend and improve on systems that simply provide data browsing capabilities, such as a user interface (UI) with filtering for the security expert. Such systems are limited in the fact that the security researcher may not know even where to start in analyzing data or applying filters. Furthermore, the time required to identify an exploit is unknown. The solution described herein also improves on systems that use AI or ML models to generate alerts, particularly in cases where the number of alerts generated is too high to be useful to the security researcher.

An embodiment of the AI model of the present specification analyzes EDR data from a number of endpoints to identify uncommon aspects of EDR, particularly as applied to a specific enterprise. This provides a mechanism that can compute in near real-time what constitutes "normal" activity within the enterprise, and filter out that normal activity from EDR traces. The security researcher is then left with EDR traces for what constitutes "abnormal" or uncommon activity within the enterprise. Note that activity that is common within one enterprise may be uncommon within another enterprise. Because APTs often target a specific enterprise, the use of focused, enterprise-level filtering by the AI model can help a security researcher to identify an attack on the particular enterprise. This enables SOC analysts and hunters to focus on the most important data within an EDR trace data set. The AI model disclosed herein can be applied in many different enterprises in multiple contexts.

An underlying principle of the ML model disclosed herein is that legitimate activity within the enterprise tends to have some degree of commonality when measured by both the pieces of software executed, and their command lines. Thus, an attacker's attempted APT exploit may generally be assumed to display uncommonality. Even when the software binaries used by the attacker are legitimate and widely used within the enterprise (e.g., Windows PowerShell), the APT's behavior may result in outlier EDR traces. The ML model of the present specification is configured to identify uncommon traces with fine-grained granularity, and identify those uncommon traces to security experts. The security experts within an SOC can then use a combination of human and machine resources to determine whether the uncommon traces do, in fact, represent an APT or other malicious object. Once an object is identified as malicious, remedial action may be taken and the enterprise can be secured against the threat.

In at least some embodiments of the present specification, the ML model applied to the EDR traces examines command lines on enterprise machines. The command line could be, for example, a Unix command line (commonly used on Apple OS X, Linux, Unix, and other Unix-like operating systems), or a Windows PowerShell command line. In an illustrative embodiment, the command line is tokenized (e.g., on spaces between parameters), and each parameterized token is assigned a numerical value. An appropriate function such as MinHash can then be applied to the entire tokenized command line, and a hash value can then be assigned to the tokenized command line. When the command line is thus reduced to a hash or signature, the hash or signature can be compared to the hashes or signatures of other objects encountered within the enterprise. This tokenizing and hashing makes the comparison of a large number of objects relatively simple for a machine. When the signatures of a large number of objects are compared to one another, outlier objects can then be identified as uncommon EDR traces. Enterprise security experts within the SOC are then left with a relatively small number of uncommon EDR traces. The security experts can investigate these uncommon traces more thoroughly, and determine if any of them are malicious or represent a threat to the enterprise. When a particular signature is correlated with a threat, then that particular uncommon trace can be associated with malicious activity. It is, thereafter, easier to identify additional malicious activity of a similar variety.

It should be noted that the hashing function used herein is useful not only for identifying overtly malicious activity, but can also identify negligent activity that may still represent a threat to the enterprise. For example, poorly developed software, even if it is not overtly malicious, may have wild or unpredictable behavior that can compromise enterprise security, and data security in particular. Such unpredictable software may be more vulnerable to exploit by malicious attackers, and may thus itself represent a security issue for the enterprise. Thus, the identification of uncommon EDR traces disclosed herein can also be used to improve the overall internal security development of the enterprise.

Embodiments of the present specification employ machine learning metrics that apply commonality analysis on client traces, such as command lines, for spotting malicious activity. The ML system disclosed herein assists human hunters and SOC analysts in identifying client traces through the lens of uncommonality. This provides superior filtering capabilities that allow security experts to focus on the most relevant EDR traces.

Embodiments of the system disclosed use MinHash and locality-sensitive hashing (LSH) models to compute similar objects in a fast and scalable manner that supports real-time or near real-time analysis. In some embodiments, EDR traces may be decorated or marked up with decorators that identify the uncommonality. This helps to assist human and machine security experts in identifying potentially suspicious EDR traces, and thus focusing their efforts. The architecture allows plug-and-play of multiple models that "decorate" raw data from different angles. The uncommon behavior detection algorithm described herein can accurately represent data received by a network system. The conversion algorithm achieves fast detection of security threats.

Embodiments of the present specification are configured to reduce the universe of data that human security experts (e.g., analysts and hunters within an SOC) need to analyze. The human expert may have tools to increase or reduce the granularity of the search space during analysis. This is in contrast with anomaly detection solutions that focus on alerting or finding silver bullets.

The system described herein builds on a notion of a commonality baseline, which is computed based on multiple time windows. The baseline may be used to spot or bring up unusual activity.

Note that the system disclosed herein does not necessarily displace or replace existing security architectures. Rather, the system described may complement security architectures that include malware classifiers. Any malware classifier could be a complementary apparatus to the mechanism described herein. A malware classifier may be used to add information to records marked as uncommon. In other embodiments, commonality may be used to identify and remove false positives. Furthermore, the method may have sufficient intelligence to perform differentiated tenancy behavior. For example, a tenancy (company), depends of the nature of its business (e.g., medicine, finance, aerospace, automotive, computer, etc.), plus its geographic offices (e.g., US, China, India, EU). Different tenancies have different type of daily basis activities, programs, OS versions, etc. The method described herein has the ability to differentiate data from tenancies and not mix data between tenancies.

Embodiments of the present specification use an implementation of MinHash and LSH that computes uncommon objects in real-time and in memory. Experimentally, as applied to actual data sets, with a data set including both normal behavior and attacks, approximately 80% of activities related to an attack were identified by the machine learning system. Furthermore, thousands of irrelevant EDR traces were eliminated, allowing security researchers to focus on only a few tens of EDR traces.

This system achieves a unique combination of efficiency and accuracy. The system described may generate a base of know-how of behavior of an enterprise, allowing the identification of threats in real-time or near real-time, across the enterprise domain. The normal know-how behavior may be computed using an online algorithm that compacts behavior with significantly less data. Thus, even though the normal know-how behavior is represented in a compact format, the system is still able to accurately detect threats that enter the enterprise as anomalies or unknown behavior. One embodiment includes a model that can be synthesized and moved to the client side to reduce the number of bits sent to the cloud, as a kind of compression.

A system and method for providing analysis of endpoint detect and response data will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Malicious object 182 could be an advanced persistent threat (APT). Client devices 110 may collect EDR data, and send EDR traces to a security services provider 190. Security services provider 190 could be a third-party security services provider such as MCAFEE, LLC, or it could be an enterprise security services provider, such as an enterprise SOC.

Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
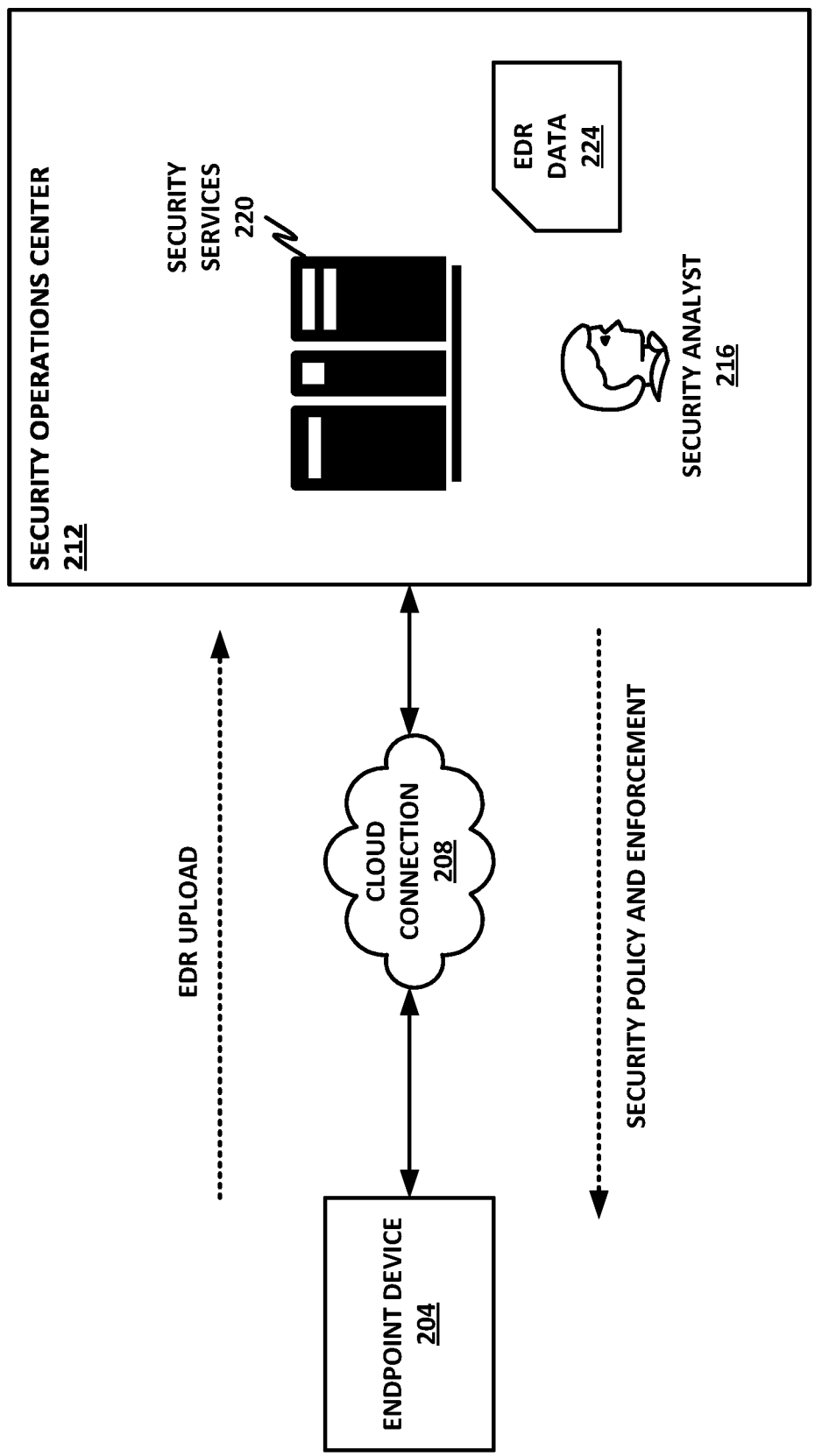
FIG. 2 is a block diagram illustrating, more particularly, collection of EDR traces within an enterprise.

FIG. 2 is a block diagram illustrating, more particularly, collection of EDR traces within an enterprise. In this example, endpoint device 204 may be any suitable endpoint device, which may communicate with a security operation center (SOC) 212 via a cloud connection 208. Cloud connection 208 could be a traditional TCP/IP network, or it could be a messaging bus, such as a data exchange layer (DXL) provided by MCAFEE, LLC, or other open, DXL-compliant messaging bus. Particularly, in some embodiments, cloud connection 208 may include a pub/sub (publish/subscribe) message bus.

Endpoint device 204 could be a client device such as client device 120 of FIG. 1, a server, a domain administrator, or any other suitable endpoint device that communicates on the pub/sub message bus.

Endpoint device 204 uploads EDR traces to SOC 212, which enables SOC 212 to provide security policy enforcement back to endpoint device 204. EDR traces may include any suitable EDR trace as discussed above.

SOC 212 includes a security services device or cluster 220. Security services cluster 220 provides analysis of EDR traces uploaded by endpoint devices 204. Security services cluster 220 receives EDR data 224, and provides EDR data 224 to human and/or machine security analyst 216. This may include a human/machine partnership, wherein machines assist humans in making intelligent decisions about which EDR traces represent malicious activity and require remedial action.

Figure 3:
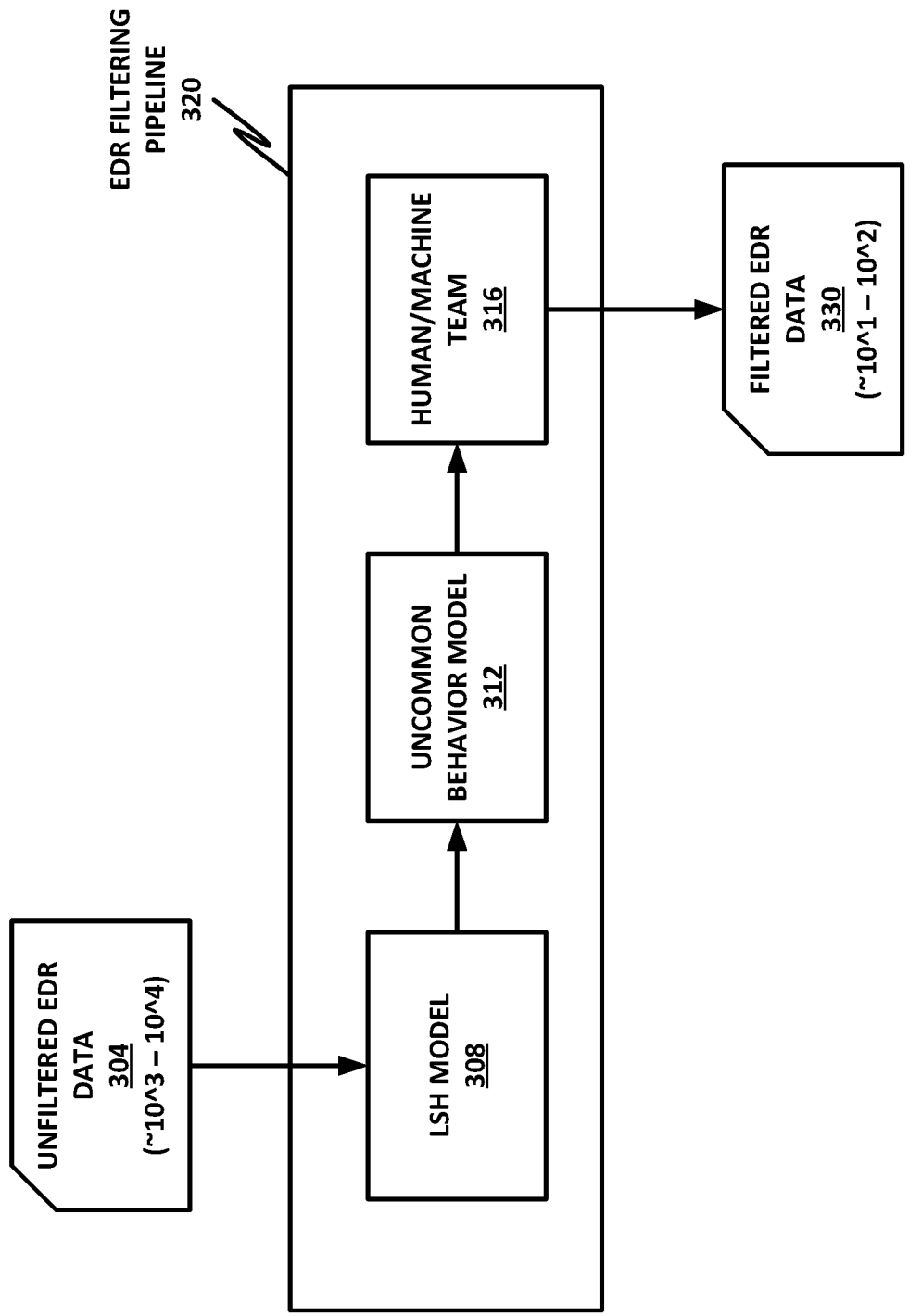
FIG. 3 is a block diagram of an EDR filtering pipeline.

FIG. 3 is a block diagram of an EDR filtering pipeline 320. As illustrated in FIG. 3, unfiltered EDR data 304 may include a large number of traces. For example, in a real data set used to test the system disclosed in the present specification, the unfiltered EDR data set included on the order of $10^3$ to $10^4$ EDR traces. In other words, the unfiltered EDR data included thousands to tens of thousands of EDR traces. A third-party security services provider monitoring a large number of enterprises could have even more, such as on the order of hundreds of thousands or millions of new EDR traces to manage per day.

Because it is impractical for human security analysts to monitor all of these EDR traces in real-time and make intelligent decisions about which ones represent a threat, it is valuable to provide a filtering capability. Although existing systems do provide filtering capabilities, such as regular expression searches and similar, these filters may not sufficiently reduce the data set for real-time or near real-time analysis by human security researchers. It is, therefore, desirable and advantageous to provide an EDR filtering pipeline 320 that provides better and more meaningful filtering that reduces the EDR traces data set to those traces most likely to represent an attack, such as an APT.

At a high level, EDR filtering pipeline 320 receives incoming traces, creates tokens, converts the set of tokens to trace signatures, reduces a command line to a signature via MinHash, uses LSH to bucket signatures and provide message routing, and then performs anomaly detection and baselining. EDR pipeline 320 aggregates values to achieve a summed value. The summed value represents the data packet in a compact format.

An embodiment of EDR filtering pipeline 320 was applied experimentally to a set of EDR records. These EDR records were associated with the MVISION EDR product provided by MCAFEE, LLC. Data analysis was performed on EDR client traces. An EDR client associated with the MVISION EDR product may collect EDR, send the EDR to the cloud, and provide client traces, including process create events by way of nonlimiting example. This may include binary names and parameters, such as an instance of Windows PowerShell with the parameters provided to the command line.

Within EDR filtering pipeline 320, LSH model 308 is an AI or ML model. LSH model 308 performs MinHash on a tokenized command line, and then provides a locality-sensitive hashing model implementation. This provides support for real-time analysis, and allows uncommon behavior detection to be performed in memory.

Uncommon behavior model 312 takes the signature provided by the combination of MinHash and LSH, and identifies uncommon traces by computing a delta between the signature and a group of common signatures. For example, something may be considered "uncommon" if it has not been seen for some time in a particular enterprise. A "Behavior Model (BM)" may be created in memory, with the command lines, parameters, and processes seen in the last T hours. The BM is an in-memory LSH representation, with a bucket and counter to the target commands lines.

When a new command line is processed, it is checked against to "BM." If the number of the bucket that represents the command line is 0 or lower, the N(threshold) is considered as uncommon. By way of code illustration:
DB-Inmemory:
<tenant_universe_id>:lsh_bucket_id:<minhash_bucket:
  count>

In at least some embodiments, uncommon behavior detection may be performed in memory. Uncommon behavior detection may be performed live, in real-time, on streams of data. The uncommon behavior model may also be used to detect different anomalous behaviors at different levels, such as atomic actions, process nesting, new threads in the environment, and others.

Uncommon behavior model 312 provides a set of EDR traces that represent uncommon behavior. These are provided to a human/machine team 316. The human/machine team 316 analyzes filtered EDR data 330, which may have been reduced to the order of $10^1$ to $10^2$ (e.g., tens to hundreds) of remaining EDR traces that were not filtered out. In some embodiments, EDR filtering pipeline 320 includes software to provide a user interface (UI), such as a graphical user interface (GUI) that enables a human analyst to perform a deep dive on the client traces. The UI may include controls that allow more or less immersive searches using the commonality or uncommonality factors derived by the AI models within LSH model 308 and uncommon behavior model 312. This allows an intelligent human researcher to analyze on the order of tens of "interesting" (e.g., uncommon) traces to determine if they represent malware. The human researcher or security expert may have tools to analyze these EDR traces in detail and provide effective security responses to the EDR traces. In particular, if an EDR trace is found to represent malicious activity, then remedial action can be taken within the enterprise. Furthermore, once the trace has been associated with malicious activity, the model disclosed herein can be used to identify similar EDR traces that may also represent malicious activity. Thus, if an uncommon EDR trace represents a new family of malware objects that have targeted the enterprise, then the same model can be used to identify other instances of the same or similar objects across the enterprise and to take remedial action.

Figure 4:
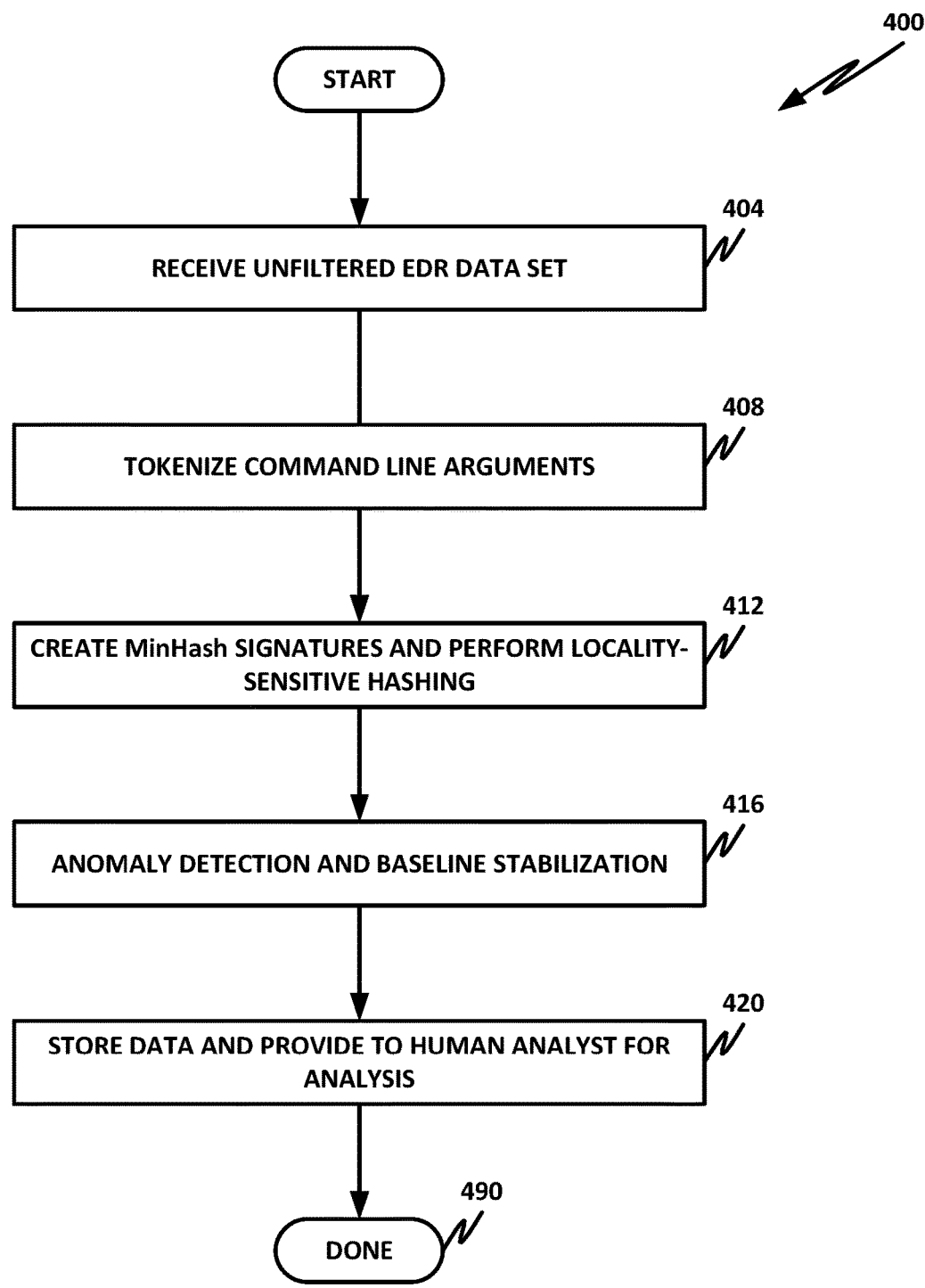
FIG. 4 is a flowchart illustrating a method.

FIG. 4 is a flowchart illustrating a method 400. Method 400 may be used to identify a threat within an enterprise, including an APT.

Method 400 may be performed, for example, by a security function within a security operation center. In block 404, the security function receives the unfiltered EDR data set from various endpoint devices. The unfiltered EDR data set includes raw EDR traces from endpoint devices. As discussed above, an SOC may receive thousands or millions of such raw EDR traces every day, depending both on the size of the enterprise, and on whether the SOC services more than one enterprise. Because of the large number of EDR traces, it may not be practical for human security experts to provide sufficient analysis for all of the EDR traces in real-time or near real-time. If the security experts are unable to perform sufficient analysis on the EDR traces, then the value of the EDR traces is reduced. Thus, the security function may include an EDR filtering pipeline to reduce the number of EDR traces that are presented to the human researcher.

In block 408, the EDR filtering pipeline begins by tokenizing command line arguments for a command line operation within the EDR trace. For example:

powershell.exe -w 1 -enc
SQBFAFgAIAAIACgAbgBIAHcALQBvAGIAagBIAG
  MAdAAgAG4AZQB0AC 4AdwBIA-
  GIAYwBsAGkAZQBuAHQAKQAuAGQA
  bwB3AG4AbABvAGEAZA
  BzAHQAcgBpAG4AZwAoACcAaABOAHQAcAA6
  AC8ALwB3AHcAdwAuAG
  YAcgBIAGUAZwBvAG8AZwBsAGUAYQBkAHM
  AZQBuAHMAZQBpAG4AZ
  gBvAC4AYwBvAG0AgA4ADAAOAAwAC8AdwB
  kAGIAeQBwAGEAcwBz ACcAKQAiAH-
  wASQBFAFgA This may be tokenized to:
powershell.exe
w
enc
SQBFAFgAIAAIACgAbgBIAHcALQBvAGIAagBIAG
  MAdAAgAG4AZQB0AC 4AdwBIA-
  GIAYwBsAGkAZQBuAHQAKQAuAGQA
  bwB3AG4AbABvAGEAZA
  BzAHQAcgBpAG4AZwAoACcAaABOAHQAcAA6
  AC8ALwB3AHcAdwAuAG
  YAcgBIAGUAZwBvAG8AZwBsAGUAYQBkAHM
  AZQBuAHMAZQBpAG4AZ
  gBvAC4AYwBvAG0AgA4ADAAOAAwAC8AdwB
  BkAGIAeQBwAGEAcwBz ACcAKQAiAH-
  wASQBFAFgA In this example, the command line arguments are tokenized on the space character. Thus, the result is a vector of string tokens. The tokens of the preceding command line may be encoded as follows:
51824959
51337164
52805434
21062496

In block 412, each token is assigned a numerical value, which may be based for example on the characters in the string. For example, each character has an associated numerical value in an ASCII or Unicode data set. Once values are assigned to the individual tokens, the entire tokenized command line can be hashed to yield a numeric signature for the tokenized command line. The security function may then perform locality-sensitive hashing to bucketize the signature of the command line.

Once the command line has been tokenized, hashed, and bucketized, then an anomaly detection module may perform anomaly detection. This module may also perform baseline stabilization on the data set. The result is that command lines that deviate from enterprise norms can be identified.

In block 420, data from the preceding operations are stored in an appropriate storage, and are then provided to a human analyst for analysis. The human analyst can then determine whether the command line represents an attack or other malicious activity. If so, then that particular signature can be correlated with malicious activity. In the future, similar signatures can also be correlated with malicious activity.

In block 490, the method is done.

Figure 5A:
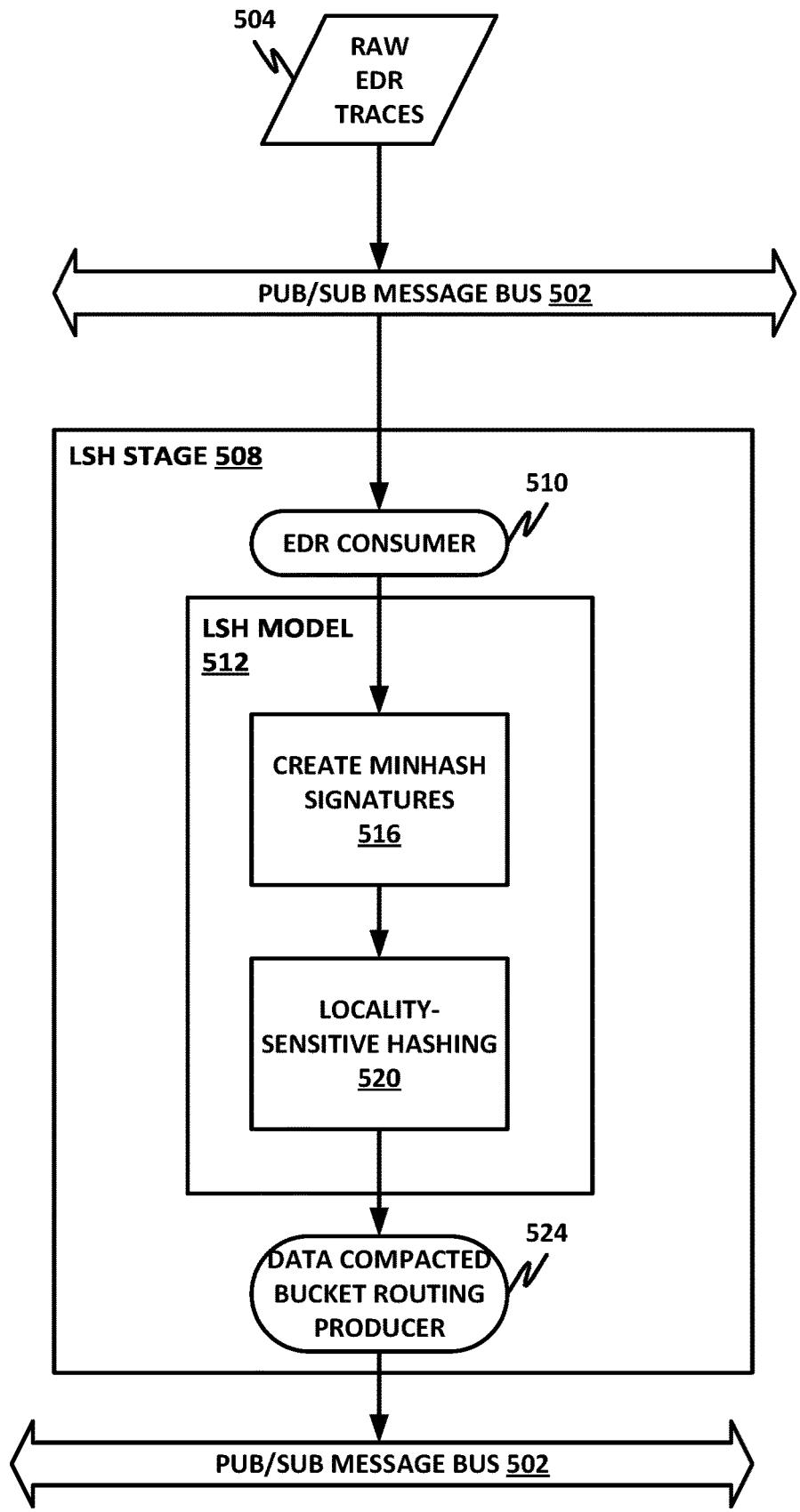
FIGS. 5a-5c illustrate a signal flow model, according to the teachings of the present specification.
Figure 5B:
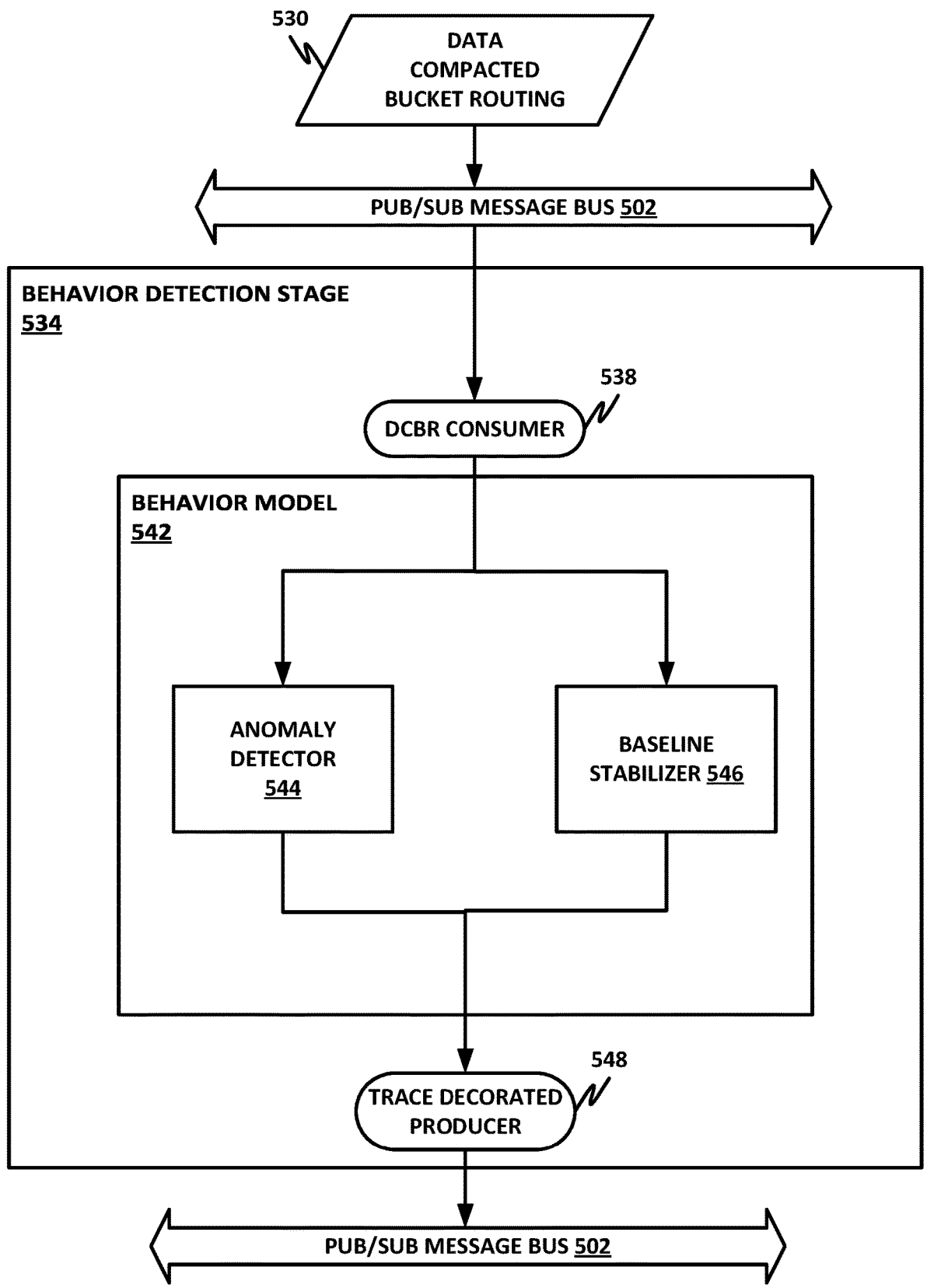
Figure 5C:
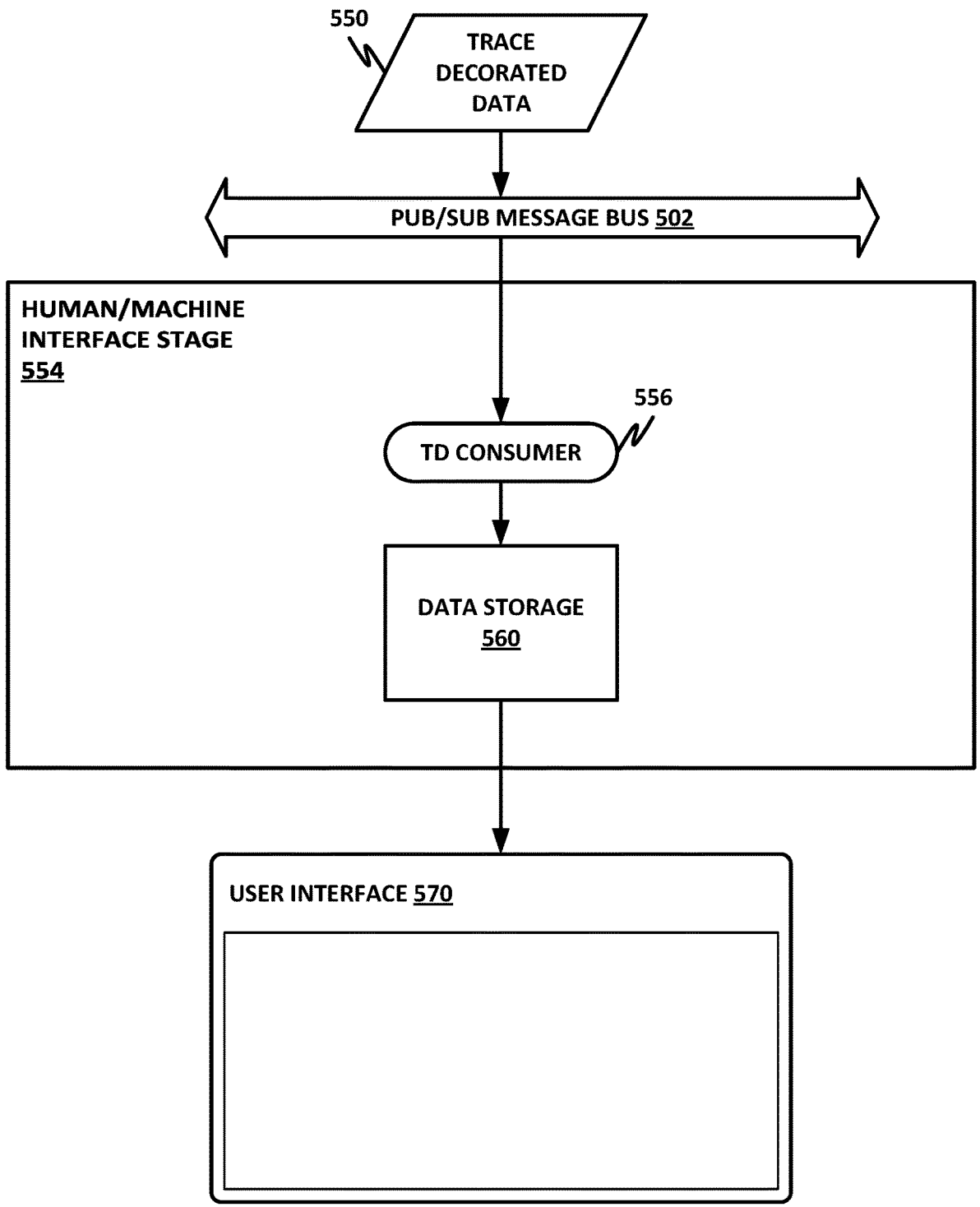

FIGS. 5a-5c illustrate a signal flow model, according to the teachings of the present specification.

Turning to FIG. 5A, the input to the overall system is a stream of raw EDR traces 504. In an illustrative embodiment, raw EDR traces 504 are published via a pub/sub message bus 502. An appropriate hardware and/or software module subscribes to the EDR trace topic, and thus receives the EDR traces when they are published.

In this example, an LSH stage 508 is provided by an appropriate hardware and/or software module. For example, the instructions could be stored on a transitory or non-transitory computer readable storage medium and retrieved at runtime from the storage. The instructions may then be configured to instruct a computer processor to carry out the instructions. In another example, a non-transitory computer readable medium includes hardware-encoded instructions within an application-specific integrated circuit (ASIC), a hardware accelerator, or other hardware device. In yet other examples, a combination of hardware, software, and/or firmware may be used to provide various aspects of LSH stage 508. As used in this specification, LSH stage 508, behavior detection stage 534 of FIG. 5B, and human/machine interface stage 554 of FIG. 5C may all be or include computer engines with an appropriate mix of hardware, software, and/or firmware. In the particular instance of human/machine interface 554, the computing engine may include a user interface or other computing functions that assist a human user such as a security expert with carrying out his or her task.

Returning to FIG. 5A, LSH stage 508 includes an EDR consumer 510. EDR consumer 510 receives raw EDR traces 504 via pub/sub message bus 502. EDR consumer 510 then provides the EDR data to LSH model 512.

Within LSH model 512, a module 516 creates MinHash signatures for each EDR trace. This may include, for example, tokenizing a command line, assigning a numerical value to each token, and performing a MinHash on the aggregate of the numerical command line tokens.

For example, the command line:
powershell.exe -w 1 -enc
SQBFAFgAIAAiACgAbgBIAHcALQBvAGIAagBIAG
  MAdAAgAG4AZQB0AC 4AdwBIA-
  GIAYwBsAGkAZQBuAHQAKQAuAGQ
  AbwB3AG4AbABvAGEAZA
  BzAHQAcgBpAG4AZwAoACcAaABOAHQAcAA6
  AC8ALwB3AHcAdwAuAG
  YAcgBIAGUAZwBvAG8AZwBsAGUAYQBkAHM
  AZQBuAHMAZQBpAG4AZ
  gBvAC4AYwBvAG0AgA4ADAAOAAwAC8AdwB
  kAGIAeQBwAGEAcwBz ACcAKQAiAH-
  wASQBFAFgA
is tokenized to:
['powershell.exe',
'-w',
'-enc',
'sqbfafgaiaaiacgabgblahcalqbvagiaagblagmadaagag4azq
  b0ac4adwbla
  giaywbsagkazqbuahqakqauagqabwb3ag4ababvageaza
  bzahqacgbpag4
  azwaoaccaaab0ahqacaa6ac8alwb3ahcadwauagyacgbl
  aguazwbvag8az
  wbsaguayqbkahmazqbuahmazqbpag4azgbvac4aywbv ag0aoga4adaao
aawac8adwbkagiaeqbwageacwbzaccakqaiahwasqbfafga']

The tokens are converted to enumerated numeric values representing the various tokens:
'powershell.exe'->51824959,
'-w'->51337164,
'-enc'->52805434,
'sqbfafgaiaaiacgabgblahcalqbvagiaagblagmadaagag4azqb0ac4adwbla
giaywbsagkazqbuahqakqauagqabwb3ag4ababvageazabzahqacgbpag4
azwaoaccaaab0ahqacaa6ac8alwb3ahcadwauagyacgblaguazwbvag8az
wbsaguayqbkahmazqbuahmazqbpag4azgbvac4aywbvag0aoga4adaao
aawac8adwbkagiaeqbwageacwbzaccakqaiahwasqbfafga'->21062496

MinHash is a technique for quickly estimating how similar two sets are. The Jaccard index may be calculated according to:

$$J(A, B) = \frac{|A \cap B|}{|A \cup B|}$$

The value is 0 when the two sets are disjoint, and 1 when they are equal. The resulting MinHash signature on the data above is:
[452975587,
334603045,
426888880,
271387278,
439567887,
526193740,
374473679,
118260055,
58833579,
684885607]

A second module 520 then performs locality-sensitive hashing. LSH is an algorithm that maps similar documents to the same value and unsimilar documents to different values. Here, "similarity" depends both on a metric being used, and a threshold s. The number of buckets may be much smaller than the universe of possible input items.

LSH is not intended to be exact. It is expected to produce some level of false positives and false negatives. For example, false positives occur when a pair is on the same entry but is below the threshold. False negatives may occur when a pair is above the threshold but on distinct entries.

However, LSH is able to hash similar input items into the same "buckets" with relatively high probability.

Thus, MinHash is used to transform a signature into a bucket, and each bucket is store in memory (e.g., {bucket, [item_count, ids]}. This reduces the number of items to search, since the bucket is the same for items with a high probability of being the same or similar.

A purpose of LSH stage 508 is to divide the data into buckets. The MinHash function of module 516 creates unigram tokens and performs size reduction by computing a signature for the command line. Module 520 finds the bucket target using the LSH algorithm.

The bucketized signature is provided to a data compacted bucket routing producer 524. Data compacted bucket routing producer 524 communicates with pub/sub bus 502 to publish the data compacted bucket routing provided by LSH model 512.

Turning to FIG. 5B, data compacted bucket routing data 530 are published to pub/sub bus 502 with an appropriate topic.

Behavior detection stage 534 includes a DCBR consumer 538 that subscribes to a topic for data compacted bucket routing on pub/sub bus 502. When a message is published with the data compacted bucket routing data, DCBR consumer 538 consumes the data from pub/sub bus 502.

DCBR consumer 538 provides its data to behavior model 542 of behavior detection stage 534. Behavior model 542 may include an AI or machine learning model, which in some embodiments operates in memory. Behavior model 542 is specifically configured to detect uncommon behavior.

In one example, behavior model 542 includes an anomaly detector 544 that detects behavior against well-known behavior in the enterprise. Anomaly detector 544 operates on the principle that malware is unlikely to behave like a common enterprise function. Rather, its behavior should deviate from the norm for enterprise behavior.

Behavior model 542 also includes a baseline stabilizer 546. Baseline stabilizer 546 stabilizes the system over time window slices.

Because an illustrative purpose is to search for uncommon or non-ordinary command lines, a behavior model (LSH DB in-memory) may be created in memory. This behavior model shifts in a configurable time window (e.g., 24 hours or 72 hours). Items outside of the window are removed as they age. This behavior model contain all items processed across the time window. If a command line is processed, and is found to not already exist in the model (e.g., it has not been encountered before), or it has a relatively low counter of occurrences in the model, it may be decorated as uncommon:
{Universe(tenancy-descriptor}: Time(HH): {buckets: {counter}}

This is referred to as a baseline stabilizer. The data are filled in the DB across the data streaming, and the oldest data are dropped. For example, a command line may be tokenized, and a MinHash signature created as follows:
[452975587,
334603045,
426888880,
271387278,
439567887,
526193740,
374473679,
118260055,
58833579,
684885607]

The signature is converted to buckets, using a grouping key "X." The threshold and the key are configurable. The grouping into bands yields:
Bucket1 [452975587, 334603045]
Bucket2 [426888880, 271387278]
Bucket3 [439567887, 526193740]
Bucket4 [374473679, 118260055]
Bucket5 [58833579, 684885607]

Behavior model 542 has a trace decorated producer 548. Trace decorated producer 548 is a producer on pub/sub bus 502, and publishes decorated traces to an appropriate topic. Decorated traces may include traces that have been identified as being uncommon, and are therefore more likely to have malicious behavior.

Turning to FIG. 5C, trace decorated data 550 are published to pub/sub bus 502. Trace decorated data 550 may include traces that have been decorated or identified as being of interest, and thus may be more worthwhile for a human security expert to investigate.

TD consumer 556 subscribes to a trace decorated data topic on pub/sub message bus 502. When trace decorated data appear on pub/sub bus 502, TD consumer 556 receives and consumes the messages. TD consumer 556 then provides the data to human/machine interface stage 554. Human/machine interface stage 554 may include a data storage 560, which is configured to persist decorated traces provided by TD consumer 556. These decorated traces are traces that may be of particular interest to a human security researcher.

Data storage 560 may then interface with a human user interface 570.

User interface 570 may allow more or less immersive searches using commonality or uncommonality. User interface 570 may provide a facility for a human user to adjust the sensitivity of the commonality detection of the system, and to view fewer or more traces based on the security researcher's needs. The human security researcher can then investigate traces that have been filtered and decorated, and identified as possibly relevant. Upon investigating these traces, if the human security researcher determines that the trace represents malicious activity, then this reputation for malicious activity can be correlated with the particular trace. Any EDR traces with a similar signature in the future may then be identified as possibly malicious, and may be subjected to additional screening or verification.

Figure 6:
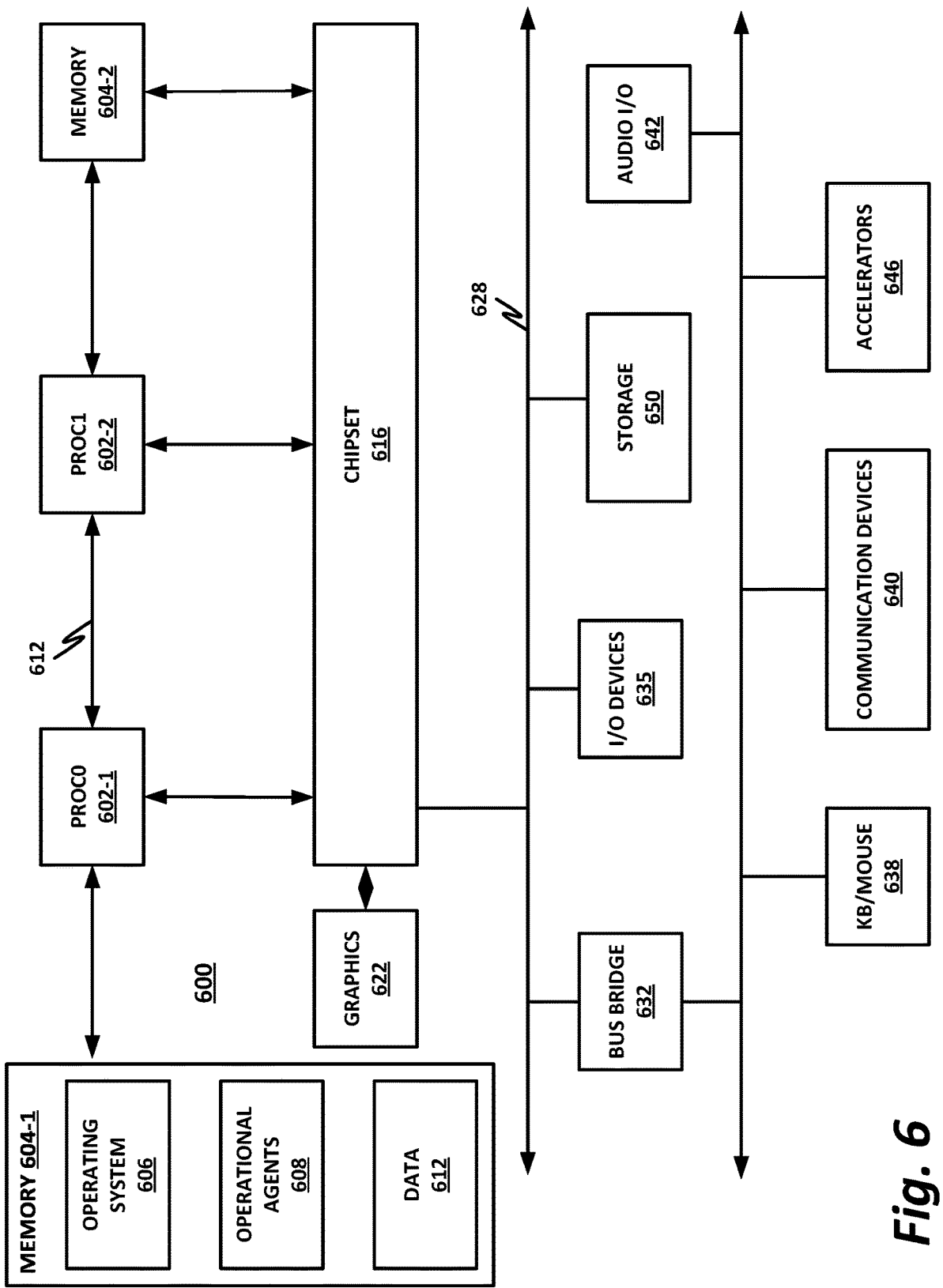
FIG. 6 is a block diagram of selected elements of a hardware platform.

FIG. 6 is a block diagram of a hardware platform 600. Embodiments of hardware platform 600 may be configured or adapted for providing analysis of endpoint detect and response data, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via a network interface, or retrieved from another source via any suitable interconnect. Once received (from any source), the instructions may be loaded into memory 604, and may then be executed by one or more processor 602 to provide elements such as an operating system 606, operational agents 608, or data 612.

Figure 8:
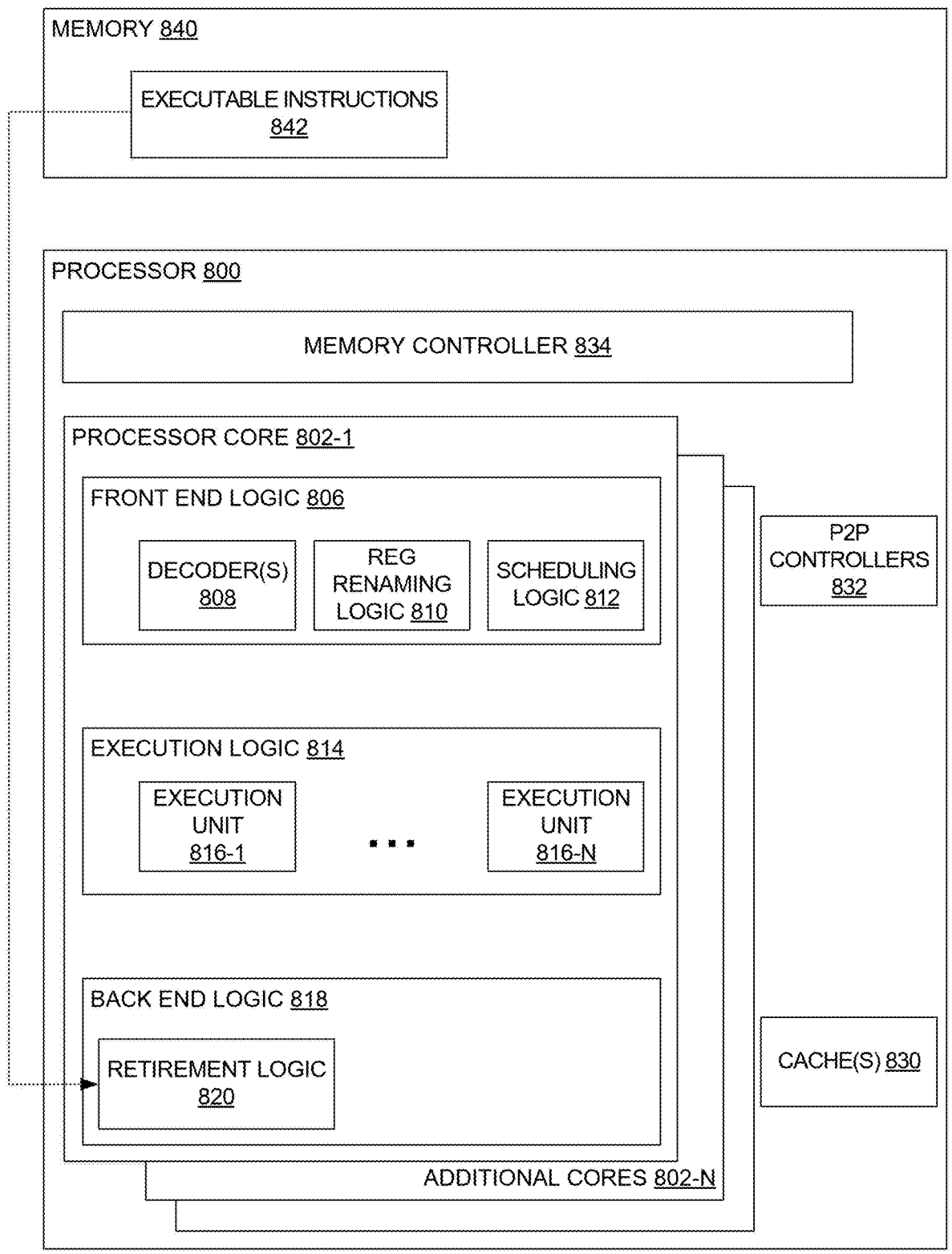
FIG. 8 is a block diagram of selected elements of a processor.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE, but one embodiment is illustrated in FIG. 8. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high-performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a CPU QF12 or on one or more different dies or packages. Each chipset may support any suitable number of CPUs 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of CPUs 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by a network interface and the various I/O devices described herein. This may include, for example, various USB, FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more nontransitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-andstay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, SCALA, Python or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. An network interface may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

Figure 7:
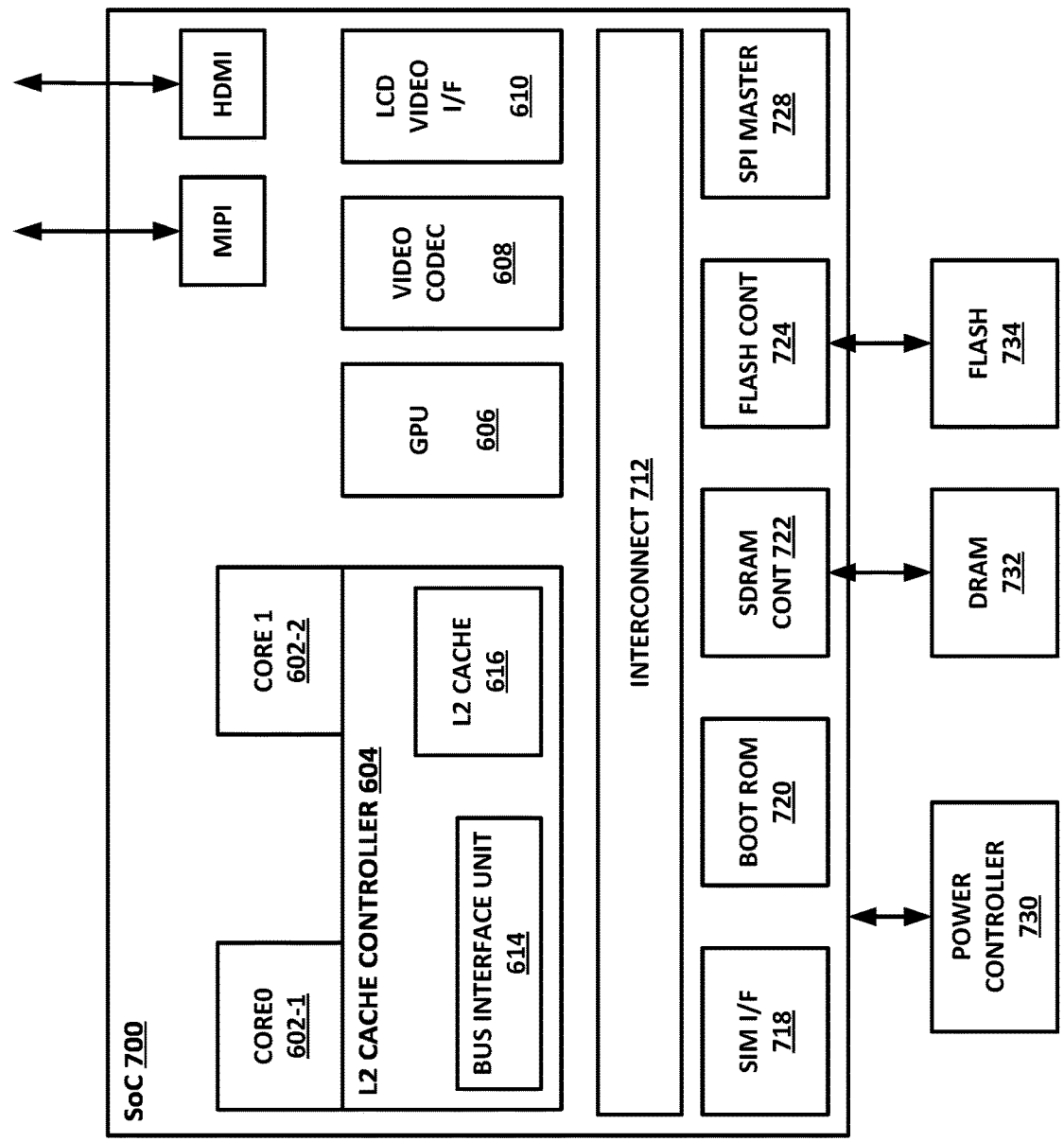
FIG. 7 is a block diagram of selected elements of a system-on-a-chip (SoC).

FIG. 7 is a block illustrating selected elements of an example system-on-a-chip (SoC) 700. Embodiments of SoC 700 may be configured or adapted for providing analysis of endpoint detect and response data, as disclosed in the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a personal computer, server, video processing components, laptop computer, notebook computer, netbook, or touch-enabled device.

As with hardware platform 600 above, SoC 700 may include multiple cores 702a and 702b. In this illustrative example, SoC 700 also includes an L2 cache control 704, a graphics processing unit (GPU) 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/high-definition multimedia interface (HDMI) links that couple to an LCD.

SoC 700 may also include a subscriber identity module (SIM) I/F 718, a boot read-only memory (ROM) 720, a synchronous dynamic random-access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

FIG. 8 is a block diagram illustrating selected elements of a processor 800. Embodiments of processor 800 may be configured or adapted for providing analysis of endpoint detect and response data, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction-set computing) machine (ARM), digital signal processor (DSP), field-programmable gate array (FPGA), graphics processing unit, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 800 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 800 includes one or more processor cores 802, including core 802-1-802-N. Cores 802 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 800 may include at least one shared cache 830, which may be treated logically as part of memory 840. Caches 830 may be filled according to known caching techniques, and may store instructions and/or data that may be used by one or more components of processor 800.

Processor 800 may include an integrated memory controller (MC) 834, to communicate with memory 840. Memory controller 834 may include logic and circuitry to interface with memory 840, and may also include a cache controller to handle filling and evicting instructions and data to and from cache 830.

By way of example, each core 802 may include front-end logic 806, execution logic 814, and back-end logic 818.

In the illustrated embodiment, front-end logic 806 includes an instruction decoder or decoders 808, register renaming logic 810, and scheduling logic 812. Decoder 808 may decode instructions received. Register renaming logic 810 may provide register renaming, for example to facilitate pipelining. Scheduling logic 812 may schedule instruction execution, and may provide out-of-order (OOO) execution. Front-end logic 806 may fetch incoming instructions, perform various processing (e.g., caching, decoding, branch predicting, etc.), and pass instructions to execution logic 814.

Execution logic 814 includes one or more execution units 816-1-816-N. Execution units 816 may include hardware instructions and microcode to carry out the provided instructions.

Backend logic 818 includes retirement logic 820. Core 802 may provide for speculative execution of instructions, branch prediction, and similar. Retirement logic 820 may be configured to determine which predicted instructions were actually needed by the program flow.

Processor 800 may also include a PtP controller 832, which enables connection to an uncore, chipset, Northbridge, Southbridge, or bus, by way of example.

A system according to the present specification was tested against a set of EDR traces provided by the MVISION EDR MITRE APT3 assessment utility. Information was filtered from the APT3 "Empire" scenario (steps 11-20). In this emulated attack, the unfiltered data set included EDRs representing 3,251 "Process Create" events. The test system highlighted/decorated 43 events. Within these 43 events were evidence of Initial Compromise, Discovery, Lateral Movement, Persistency, Exfiltration, and Execution of Persistency.

Examples of decorated command line events, with their corresponding behavior, include:

TABLE 1

| Command Line Trace | Step Identification |
|---|---|
| "C:\Windows\System32\WScript.exe" "C:\Users\bob\Desktop\autoupdate.vbs" "C:\Windows\System32\WindowsPowerShell\v1.0\powershell.exe" -noP -w 1 -enc [LONG ASCII STRING] | Step 11: Initial Compromise (Step 11) 11.A.1 - Scripting (T1064) via PowerShell (T1086) A legitimate user executed the VBScript stager, which launches PowerShell to download and execute and Empire payload. |
| "C:\Windows\System32\ROUTE.EXE" print | Step 12: Initial Discovery 12.A.1 - System Network Discovery (T1016) via PowerShell (T1086) The route utility was executed via PowerShell to enumerate the local routing table. |
| "C:\Windows\System32\ipconfig.exe" /all | (Step 12) 12.A.2 - System Network Discovery (T1016) via PowerShell (T1086) The ipconfig utility was executed via PowerShell to enumerate local TCP/IP network configuration information. |
| "C:\Windows\System32\qprocess.exe" * | (Step 12) 12.B.1 - System Owner/User Discovery (T1033) via PowerShell (T1086) The whoami utility was executed via PowerShell to enumerate information about the current user context |
| "C:\Windows\System32\whoami.exe" /all /fo list | (Step 12) 12.C.1 - Process Discovery (T1057) via PowerShell (T1086) The qprocess utility was executed via PowerShell to enumerate local running processes. |
| "C:\Windows\System32\NETSTAT.EXE" -ano | (Step 12) 12.D.1 - System Service Discovery (T1007) via PowerShell (T1086) The net utility was executed via PowerShell to enumerate local active services. |
| "C:\Windows\System32\WindowsPowerShell\v1.0\powershell.exe" -noninteractive -Sta -encoded Command [LONG ASCII STRING] | (Step 12) 12.E.1 - Scripting (T1064) via PowerShell (T106) and Execution through API (T1106) The Empire WinEnum module was executed via PowerShell to execute the following Discovery and Collection techniques (12.F.1.1-12.G.1.2). |
| C:\Windows\System32\net1 localgroup administrators | (Step 12) 12.F.1.1 - Permissions Group Discovery (T1069) via PowerShell (T1086) The net utility was executed via PowerShell to enumerate members of the Domain Administrators group. |
| "C:\Windows\System32\reg.exe" query HKLM\SOFTWARE\Microsoft\Windows\CurrentVersion\Policies\System | (Step 12) 12.G.1.1 - Account Discovery (T1087) via PowerShell (T1086) The net utility was executed via PowerShell to enumerate local system user accounts. |

TABLE 1-continued

43 Uncommon Traces

| Command Line Trace | Step Identification |
|---|---|
| "C:\Windows\SERVIC~2\NETWOR~1\AppData\Local\Temp\mpam-e54111f5.exe" /q WD | |
| hostname | |
| powershell.exe -w 1 -enc [LONG ASCII STRING] | 12.G.1.2 - Account Discovery (T1087) via PowerShell (T1086) The net utility was executed via PowerShell to enumerate domain user accounts |
| "C:\Windows\System32\Sethc.exe" /AccessibilitysoundAgent | |
| "C:\Windows\System32\mstsc.exe" | |
| C:\Windows\System32\AUDIODG.EXE 0x37c | |
| "C:\Windows\System32\NOTEPAD.EXE" Z: \Documents\IT_tasks.txt | |
| "C:\Windows\System32\SLUI.EXE" RuleID=[LONG ASCII STRING] | |
| "C:\Windows\System32\SLUI.EXE" RuleID=[LONG ASCII STRING] | |
| werefault.exe /h /shared Global\[LONG ASCII STRING] | |
| werefault.exe /h /shared Global\[LONG ASCII STRING] | |
| "C:\Windows\System32\WScript.exe" "C:\windows\autoupdate.vbs" | Step 16: Lateral Movement 16.H.1 - System Service Discovery (T1007) via PowerShell (T1086) The sc utility was executed via PowerShell to enumerate active services on the domain controller. 16.I.1 - New Service (T1050) and Masquerading (T1036) via PowerShell (T1086) The sc utility was executed via PowerShell to create and attempt to disguise a new service on the domain controller. 16.J.1 - System Service Discovery (T1007) via PowerShell (T1086) The sc utility was executed via PowerShell to enumerate the newly created service on the domain controller. 16.K.1 - File and Directory Discovery (T1083) via PowerShell (T1086) The native type command was executed via PowerShell to enumerate the Empire stager previously copied to the domain controller. 16.L.1 - Service Execution (T1035) via PowerShell (T1086) The sc utility was executed via PowerShell to launch the newly created service on the domain controller, executing the Empire stager on the domain controller. |
| "C:\Windows\System32\sc.exe" \\creeper query | (Step 16) |
| "C:\Windows\System32\sc.exe" \\creeper create AdobeUpdater binPath= "cmd.exe /c \"C:\Users\kmitnick\AppData\Roaming\Adobe\Flash Player\update.vbs\"** displayName= "Adobe Flash Updater" start= auto | (Step 16) |
| "C:\Windows\System32\sc.exe" \\creeper qc AdobeUpdater | (Step 16) |

TABLE 1-continued

43 Uncommon Traces

| Command Line Trace | Step Identification |
| --- | --- |
| "C:\Windows\System32\sc.exe" \\creeper description AdobeUpdater "Synchronize with Adobe for security updates" | (Step 16) |
| "C:\Windows\System32\WScript.exe" "C:\Users\kmitnick\AppData\Roaming Adobe\Flash Player\update.vbs" C:\Users\azureadmin\AppData\Local\Microsoft\OneDrive\OneDriveStandaloneUpdater.exe | (Step 16) |
| "C:\Windows\System32\icacls.exe" C:\Windows\System32\magnify.exe /grant SYSTEM:F | Step 17: Persistence 17.B.1 - File Permissions Modification (T1222) via PowerShell (T1086) The takeown utility was executed via PowerShell to obtain ownership of the magnify utility binary. 17.B.2 - File Permissions Modification (T1222) via PowerShell (T1086) The icacls utility was executed via PowerShell to modify the discretionary access control list for the magnify utility binary. |
| C:\Windows\System32\Ipremove.exe | (Step 19) |
| C:\Windows\System32\srtasks.exe ExecuteScheduledSPPCreation | (Step 19) |
| "C:\Windows\recycler.exe" a -hpfGzq5yKw C:\$Recycle.Bin\old C:\$Recycle.Bin\Shockwave_network.vsdx | Step 19: Exfiltration 19.B.1 - Data Compressed (T1002), Data Encrypted (T1022), Masquerading (T1036) The renamed WinRAR utility was used to create an encrypted archive of the previously staged target file. |
| "C:\Windows\System32\ftp.exe" -v -s:ftp.txt | (Step 19) |
| "C:\Windows\recycler.exe" a -hpfGzq5yKw C:\$Recycle.Bin\old C:\$Recycle.Bin\shockwave_rackb_diagram.vsdx | (Step 19) |
| "C:\Windows\System32\ftp.exe" -v -s:ftp.txt | (Step 19) 19.C.1 - Exfiltration over Alternative Protocol (T1048) The ftp utility was executed to copy the previously created archive through a network connection separate of the C2 channel. |
| explorer.exe "C:\Windows\System32\SystemPropertiesR.emote.exe" | |
| "C:\Windows\System32\Magnify.exe" utilman.exe /debug | (Step 20) Step 20: Execution of Persistence 20.A.1 - Accessibility Features (T1015) via Remote Desktop Protocol (T1076) from 17.C The cmd binary that replaced the magnify binary was executed through the logon screen. 20.B.1 - System Owner/User Discovery (T1033) The native whoami command was executed via the previously launched cmd. |
| whoami | (Step 20) 20.B.1 - System Owner/User Discovery (T1033) The native whoami command was executed via the previously launched cmd. |

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed by way of example a method of detecting security threats for an enterprise, comprising: filtering a first set of endpoint metadata records to identify a subset of metadata records, wherein filtering comprises identifying endpoint security metadata records that are uncommon in context of the enterprise; and designating the subset of metadata records as indicating a potential security threat comprising designating the subset of metadata records for human analysis.

Example 2 includes the method of example 1, wherein the first set of endpoint metadata records are an unfiltered set.

Example 3 includes the method of example 1, wherein the subset of metadata records is less than one tenth a size of the first set of endpoint metadata records.

Example 4 includes the method of example 1, further comprising providing the subset of metadata records to a security operations center for human analysis.

Example 5 includes the method of example 1, further comprising receiving an instruction from a human actor to adjust a threshold for identifying uncommon security metadata records.

Example 6 includes the method of example 5, further comprising providing a graphical user interface to receive the instruction from the human actor.

Example 7 includes the method of example 1, further comprising using cooperative human/machine interaction to perform the human analysis.

Example 8 includes the method of example 1, further comprising using a hash to filter the first set of endpoint metadata records.

Example 9 includes the method of example 8, wherein the hash is a MinHash.

Example 10 includes the method of example 1, further comprising identifying command line operations within the endpoint metadata records and tokenizing the command line operations on a token.

Example 11 includes the method of example 10, further comprising assigning respective tokens a numerical value according to characters within the respective tokens.

Example 12 includes the method of example 11, further comprising hashing the tokens.

Example 13 includes an apparatus comprising means for performing the method of any of examples 1-12.

Example 14 includes the apparatus of example 13, wherein the means for performing the method comprise a processor and a memory.

Example 15 includes the apparatus of example 14, wherein the memory comprises machine-readable instructions that, when executed, cause the apparatus to perform the method of any of examples 1-12.

Example 16 includes the apparatus of any of examples 13-15, wherein the apparatus is a computing system.

Example 17 includes least one computer readable medium comprising instructions that, when executed, implement a method or realize an apparatus as in any of examples 1-16.

Example 18 includes one or more tangible, nontransitory computer-readable storage media having stored thereon executable instructions to instruct a processor circuit to: filter a first set of endpoint security records to identify a subset of security records, wherein filtering comprises identifying endpoint security records that are uncommon in context of an enterprise; and designating the subset of endpoint security records as indicating a potential security threat to the enterprise, comprising designating the subset of endpoint security records for human analysis.

Example 19 includes the one or more tangible, nontransitory computer-readable storage media of example 18, wherein the first set of endpoint security records are an unfiltered set.

Example 20 includes the one or more tangible, nontransitory computer-readable storage media of example 18, wherein the subset of endpoint security records is less than one tenth a size of the first set of endpoint security records.

Example 21 includes the one or more tangible, nontransitory computer-readable storage media of example 18, further comprising providing the subset of metadata records to a security operations center for human analysis.

Example 22 includes the one or more tangible, nontransitory computer-readable storage media of example 18, wherein the instructions are further to receive an instruction from a human actor to adjust a threshold for identifying uncommon endpoint security records.

Example 23 includes the one or more tangible, nontransitory computer-readable storage media of example 22, wherein the instructions are further to provide a graphical user interface to receive the instruction from the human actor.

Example 24 includes the one or more tangible, nontransitory computer-readable storage media of example 18, wherein the instructions are further to provide a cooperative human/machine interaction to perform the human analysis.

Example 25 includes the one or more tangible, nontransitory computer-readable storage media of example 18, wherein the instructions are further to use a hash to filter the first set of endpoint security metadata records.

Example 26 includes the one or more tangible, nontransitory computer-readable storage media of example 25, wherein the hash is a MinHash.

Example 27 includes the one or more tangible, nontransitory computer-readable storage media of example 18, wherein the instructions are further to identify command line operations within the endpoint security records and tokenize the command line operations on a token.

Example 28 includes the one or more tangible, nontransitory computer-readable storage media of example 27, wherein the instructions are further to assign respective tokens a numerical value according to characters within the respective tokens.

Example 29 includes the one or more tangible, nontransitory computer-readable storage media of example 28, wherein the instructions are further to hash the tokens.

Example 30 includes a computing ecosystem, comprising one or more computer, virtual machines, or containers, comprising: at least one processor circuit; at least one memory circuit; instructions encoded within the at least one memory circuit to instruct the at least one processor circuit to: filter a first set of endpoint security records to identify a subset of security records, wherein filtering comprises identifying endpoint security records that are uncommon in context of an enterprise; and designating the subset of endpoint security records as indicating a potential security threat to the enterprise, comprising designating the subset of endpoint security records for human analysis.

Example 31 includes the computing ecosystem of example 30, wherein the first set of endpoint security records are an unfiltered set.

Example 32 includes the computing ecosystem of example 30, wherein the subset of endpoint security records is less than one tenth a size of the first set of endpoint security records.

Example 33 includes the computing ecosystem of example 30, further comprising providing the subset of metadata records to a security operations center for human analysis.

Example 34 includes the computing ecosystem of example 30, wherein the instructions are further to receive an instruction from a human actor to adjust a threshold for identifying uncommon endpoint security records.

Example 35 includes the computing ecosystem of example 34, wherein the instructions are further to provide a graphical user interface to receive the instruction from the human actor.

Example 36 includes the computing ecosystem of example 30, wherein the instructions are further to provide a cooperative human/machine interaction to perform the human analysis.

Example 37 includes the computing ecosystem of example 30, wherein the instructions are further to use a hash to filter the first set of endpoint security metadata records.

Example 38 includes the computing ecosystem of example 37, wherein the hash is a MinHash.

Example 39 includes the computing ecosystem of example 30, wherein the instructions are further to identify command line operations within the endpoint security records and tokenize the command line operations on a token.

Example 40 includes the computing ecosystem of example 39, wherein the instructions are further to assign respective tokens a numerical value according to characters within the respective tokens.

Example 41 includes the computing ecosystem of example 40, wherein the instructions are further to hash the tokens.

What is claimed is:

1. A method of detecting security threats for an enterprise, comprising:
   computing commonality baseline metadata records based on multiple time windows;
   filtering a first set of endpoint metadata records to identify a subset of metadata records, wherein filtering includes identifying, via machine learning, a delta between the first set of endpoint security metadata records and the commonality baseline metadata records;
   based on the filtering designating the subset of metadata records as indicating a potential security threat, wherein designating includes designating the subset of metadata records for human analysis;
   identifying command line operations within the endpoint metadata records; and
   tokenizing the command line operations into a token, wherein the token is assigned a numerical value.

2. The method of claim 1, wherein the first set of endpoint metadata records are an unfiltered set.

3. The method of claim 1, wherein the subset of metadata records is less than one tenth a size of the first set of endpoint metadata records.

4. The method of claim 1, further including providing the subset of metadata records to a security operations center for human analysis.

5. The method of claim 1, further including receiving an instruction from a human actor to adjust a threshold for identifying uncommon security metadata records.

6. The method of claim 5, further including providing a graphical user interface to receive the instruction from the human actor.

7. The method of claim 1, further including using cooperative human/machine interaction to perform the human analysis.

8. The method of claim 1, further including using a hash to filter the first set of endpoint metadata records.

9. The method of claim 8, wherein the hash is a MinHash.

10. The method of claim 1, further including performing locality-sensitive hashing to group the tokenized command line operations.

11. The method of claim 1, wherein the numerical value is based on characters within the respective tokens.

12. The method of claim 1, wherein the commonality baseline metadata records based on multiple time windows represent metadata that are common in context of the enterprise at different times.

13. One or more tangible, non-transitory computer-readable storage media having stored thereon executable instructions to instruct a processor circuit to:
   compute baseline security records based on multiple time windows;
   filter a first set of endpoint security records to identify a subset of security records, wherein filtering includes identifying, via machine learning, a delta between the first set of endpoint security records and the baseline security records;
   based on the filtering, designating the subset of endpoint security records as indicating a potential security threat to an enterprise, wherein designating includes designating the subset of endpoint security records for human analysis;
   identify command line operations within the endpoint metadata records; and
   tokenize the command line operations into a token, wherein the token is assigned a numerical value.

14. The one or more tangible, non-transitory computer-readable storage media of claim 13, wherein the subset of endpoint security records is less than one tenth a size of the first set of endpoint security records.

15. The one or more tangible, non-transitory computer-readable storage media of claim 13, wherein the instructions are further to perform locality-sensitive hashing to group the tokenized command line operations.

16. The one or more tangible, non-transitory computer-readable storage media of claim 13, wherein the numerical value is based on characters within the respective tokens.

17. A computing ecosystem including one or more computers, virtual machines, or containers, the computing system comprising:
   at least one processor circuit;
   at least one memory circuit;
   instructions encoded within the at least one memory circuit to instruct the at least one processor circuit to:
      compute baseline security records based on multiple time windows;
      filter a first set of endpoint security records to identify a subset of security records, wherein filtering includes identifying, via machine learning, a delta between the first set of endpoint security records and the baseline security records;
      based on the filtering, designating the subset of endpoint security records as indicating a potential security threat to an enterprise, wherein designating includes designating the subset of endpoint security records for human analysis;
      identify command line operations within the endpoint metadata records; and
      tokenize the command line operations into a token, wherein the token is assigned a numerical value.

18. The computing ecosystem of claim 17, further including providing the subset of metadata records to a security operations center for human analysis.

19. The computing ecosystem of claim 17, wherein the instructions are further to receive an instruction from a human actor to adjust a threshold for identifying uncommon endpoint security records.

20. The computing ecosystem of claim 17, wherein the instructions are further to provide a cooperative human/machine interaction to perform the human analysis.

* * * * *

UNITED STATES PATENT AND TRADEMARK OFFICE
CERTIFICATE OF CORRECTION

PATENT NO. : 12,231,443 B2
APPLICATION NO. : 18/121543
DATED : February 18, 2025
INVENTOR(S) : March et al.

Page 1 of 1

It is certified that error appears in the above-identified patent and that said Letters Patent is hereby corrected as shown below:

On the Title Page

Item (73), Assignee, Delete "Musaruba US LLC, Plano, TX (US)" Insert --Musarubra US LLC, Plano, TX (US)--.

Signed and Sealed this
Sixth Day of May, 2025

Coke Morgan Stewart
*Acting Director of the United States Patent and Trademark Office*